(12) United States Patent
Jintaseranee et al.

(10) Patent No.: US 9,413,674 B1
(45) Date of Patent: Aug. 9, 2016

(54) AVOIDANCE OF UNNECESSARY TRAFFIC IN WIRELESS COMMUNICATIONS NETWORKS

(71) Applicant: Sprint Communications Company L.P., Overland Park, KS (US)

(72) Inventors: Kosol Jintaseranee, Sunnyvale, CA (US); Mark Evans, San Mateo, CA (US); Heesook Choi, Foster City, CA (US); Emel Meteoglu, San Mateo, CA (US)

(73) Assignee: Sprint Communications Company L.P., Overland Park, KS (US)

( * ) Notice: Subject to any disclaimer, the term of this patent is extended or adjusted under 35 U.S.C. 154(b) by 171 days.

(21) Appl. No.: 13/796,679

(22) Filed: Mar. 12, 2013

(51) Int. Cl.
  *H04L 12/26* (2006.01)
  *H04L 12/823* (2013.01)
  *H04L 12/801* (2013.01)

(52) U.S. Cl.
  CPC .............. *H04L 47/323* (2013.01); *H04L 47/14* (2013.01)

(58) Field of Classification Search
  CPC ....................................................... H04L 47/12
  See application file for complete search history.

(56) References Cited

U.S. PATENT DOCUMENTS

| | | | |
|---|---|---|---|
| 7,499,466 B2* | 3/2009 | Hundscheidt et al. | 370/432 |
| 7,603,430 B1* | 10/2009 | Artz, Jr. | H04L 69/28 |
| | | | 707/999.01 |
| 2005/0165928 A1* | 7/2005 | Shu et al. | 709/224 |
| 2007/0268888 A1* | 11/2007 | Shatzkamer et al. | 370/352 |
| 2012/0096538 A1* | 4/2012 | Delos Reyes et al. | 726/12 |

* cited by examiner

*Primary Examiner* — Huy D Vu
*Assistant Examiner* — Kevin Cunningham (57) ABSTRACT

Systems, methods, and computer-readable storage media for avoiding unnecessary traffic in wireless communications networks. An Internet gateway maintains an unnecessary traffic avoidance table and to determine whether a mobile device is disconnected from the network. The Internet gateway discards requested data packets requested by the mobile devices if the mobile device is not currently connected to the network, thereby avoiding unnecessary traffic in the network.

17 Claims, 6 Drawing Sheets

| CURRENT IP | CURRENT NAI | PREVIOUS NAI | OPEN FLOW | TIME |
|---|---|---|---|---|
| 1.1.1.1 | MOBILE A | - | VIDEO TRAFFIC | 4:49 PM |
| 1.1.1.2 | MOBILE B | - | SOUND FILES | 4:50 PM |
| 1.1.1.1 | MOBILE C | MOBILE A | SPREAD SHEET | 4:51 PM |

AVOIDANCE OF UNNECESSARY TRAFFIC IN WIRELESS COMMUNICATIONS NETWORKS

SUMMARY

A high-level overview of various aspects of the invention are provided here for that reason, to provide an overview of the disclosure and to introduce a selection of concepts that are further described below in the detailed description section. This summary is not intended to identify key features or essential features of the claimed subject matter, nor is it intended to be used as an aid in isolation to determine the scope of the claimed subject matter.

In brief, and at a high level, this disclosure describes, among other things, avoidance of unnecessary traffic in wireless communications networks. In one embodiment, there are multiple servers in communication with an Internet gateway that maintains an unnecessary traffic avoidance table. The unnecessary traffic avoidance table includes data regarding the current Network Access Identifier (NAI) which designates an active mobile device currently connected to the network and receiving requested data from one of the servers. The Internet gateway accesses the unnecessary traffic avoidance table to verify whether a mobile device requesting data packets from a server is disconnected from the wireless communications network (e.g., mobile device turned off, battery depleted in mobile device). If the current NAI is no longer associated with the mobile device making the data request, then it is indicative that the mobile device making the data request has been disconnected from the wireless communications network. Upon determining that the mobile device making the data request is disconnected from the wireless communications network, the Internet gateway may discard the requested data packets and end the associated user session. The table may then be updated with this information.

BRIEF DESCRIPTION OF THE SEVERAL VIEWS OF THE DRAWINGS

Illustrative embodiments of the present invention are described in detail below with reference to the attached drawing figures, and wherein.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of the methods employed, the terms should not be interpreted as implying any particular order among or between various steps herein disclosed unless and except when the order of individual steps is explicitly described.

Throughout the description of embodiments of the present invention, several acronyms and shorthand notations are used to aid the understanding of certain concepts pertaining to the associated methods, systems, and computer-readable media. These acronyms and shorthand notations are solely intended for the purpose of providing an easy methodology of communicating the ideas expressed herein and are in no way meant to limit the scope of the present invention. The following is a list of these acronyms:

| | |
|---|---|
| 3G | Third-Generation Wireless Technology |
| 4G | Fourth-Generation Cellular Communication System |
| BSC | Base Station Controller |
| BTS | Base Transceiver Station |
| CD-ROM | Compact Disk Read Only Memory |
| CDMA | Code Division Multiple Access |
| GPRS | General Packet Radio Service |
| GSM | Global System for Mobile communications: originally from Groupe Special Mobile |
| DVD | Digital Versatile Discs |
| EEPROM | Electrically Erasable Programmable Read Only Memory |
| ESN | Electronic Serial Number |
| EVDO | Evolution Data Optimized |
| LED | Light Emitting Diode |
| LTE | Long Term Evolution |
| PC | Personal Computer |
| PCS | Personal Communications Service |
| PDA | Personal Digital Assistant |
| RAM | Random Access Memory |
| ROM | Read Only Memory |
| TDMA | Time Division Multiple Access |
| UMTS | Universal Mobile Telecommunications Systems |

Further, various technical terms are used throughout this description. An illustrative resource that fleshes out various aspects of these terms can be found in Newton's Telecom Dictionary, 25th Edition (2009).

Embodiments of the technology may take the form of, among other things, a method, system, or set of instructions embodied on one or more computer-readable media. Computer-readable media include both volatile and nonvolatile media, removable and non-removable media, and contemplate media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to, information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Radio signals in wireless technologies and mobile device battery life are both limited resources. Sending unrequested data packets to mobile devices unnecessarily drains these limited resources. This may occur when a first mobile device associated with an Internet Protocol (IP) address requests data packets from a server and then subsequently disconnects from the wireless communications network. A second mobile device is then assigned to the same IP address and may unnecessarily receive the data packets requested by the first mobile device. Meanwhile, the first mobile device is still being billed for the data packets it did not receive after disconnecting from the wireless communications network. As a result, the unwanted, and likely useless, data packets drain limited radio resources, create network congestion, and reduce the second mobile device's battery life. Ultimately, the whole episode provides bad user experiences for users of both the first and second mobile devices.

As mentioned, embodiments of the present invention are directed to avoidance of unnecessary traffic in wireless communications networks. The present invention provides a way to avoid sending unwanted data packets to mobile devices by discarding data packets requested by disconnected mobile devices.

In a first aspect of the present invention, one or more computer-readable storage media are provided having computer-executable instructions embodied thereon that, when executed by a computing device, cause the computing device to perform a method of avoiding unnecessary traffic in a wireless communications network. The method comprises connecting a first mobile device having a first Network Access Identifier (NAI) to a wireless communications network, assigning a first Internet Protocol (IP) address to the first mobile device, and initiating a first user session associated with the first IP address. The method further includes, at an Internet gateway, receiving a request for at least one data packet from the first mobile device, and communicating the request for the at least one data packet to a first server. The method also includes receiving the at least one data packet from the first server, maintaining an unnecessary traffic avoidance table at the Internet gateway that includes a mapping of, at least, the first IP address and an NAI corresponding to a mobile device that is currently associated with the first IP address, and determining that the first mobile device is disconnected from the wireless communications network if the unnecessary traffic avoidance table indicates, based on the NAI mapped to the first IP address, that a second mobile device is currently associated with the first IP address. Additionally, the method includes, upon determining that the first mobile device is disconnected from the wireless communications network, discarding the at least one data packet from the Internet gateway and terminating the first user session associated with the first IP address.

In a second aspect, one or more computer-readable storage media is provided having computer-executable instructions embodied thereon that, when executed by a computing device, cause the computing device to perform a method of avoiding unnecessary traffic in a wireless communications network. The method comprises initiating a first user session for a first mobile device having a first Network Access Identifier (NAI) and a first Internet Protocol (IP) address, and at an Internet gateway, receiving at least one data packet from a first server. The method also includes accessing an unnecessary traffic avoidance table to determine that the first mobile device is disconnected from a wireless communications network. The table includes a current NAI and a previous NAI mapped to the first IP address. Further, the method includes determining from the unnecessary traffic avoidance table that the current NAI mapped to the first IP address is associated with a second mobile device, based on the determination that the current NAI mapped to the first IP address is associated with the second mobile device, discarding the at least one data packet from the Internet gateway, and terminating the first user session associated with the first IP address. Additionally, the method includes initiating a second user session for the second mobile device having a second NAI and the first IP address, and maintaining the unnecessary traffic avoidance table.

In a third aspect, a system is provided for avoiding unnecessary traffic in a wireless communications network. The system comprises an Internet gateway capable of: communicating with a first mobile device to receive a request from the first mobile device for one or more data packets and to send the one or more data packets to the first mobile device from one or more servers, maintaining an unnecessary traffic avoidance table that includes a mapping of, at least, a first NAI corresponding to the first mobile device and a second NAI corresponding to a second mobile device mapped to a first IP address, wherein the first NAI is previously associated with the first IP address and wherein the second NAI is currently associated with the first IP address, and accessing the unnecessary traffic avoidance table to determine to discard the one or more data packets received from the one or more servers prior to sending the one or more data packets to the first mobile device if the first IP address is currently associated with the second mobile device that did not request the one or more data packets received from the one or more servers. The system also includes at least one server capable of communicating with the Internet gateway, wherein communicating comprises sending the one or more data packets to the Internet Gateway based upon a request for the one or more data packets by the first mobile device.

Figure 1:
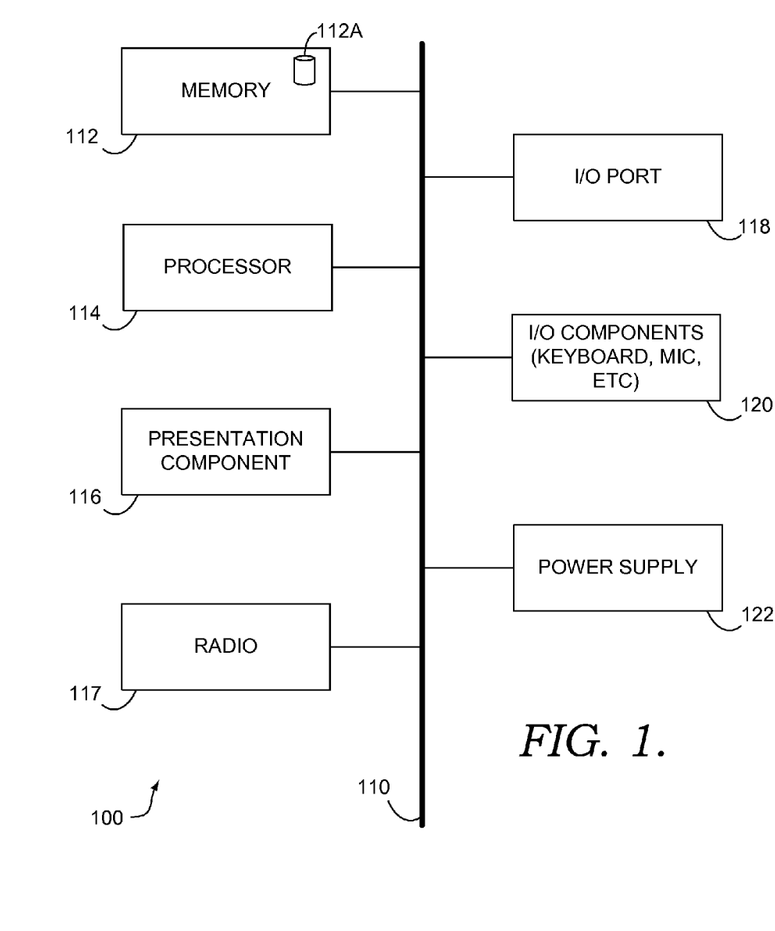
FIG. 1 depicts a block diagram of a mobile device in accordance with an embodiment of the present invention.

Turning now to FIG. 1, a block diagram of an illustrative mobile device is provided and referenced generally by the numeral 100. Although some components are shown in the singular, they may be plural. For example, mobile device 100 might include multiple processors or multiple radios, etc. As illustratively shown, mobile device 100 includes a bus 110 that directly or indirectly couples various components together including memory 112, a processor 114, a presentation component 116, a radio 117, input/output (I/O) ports 118, I/O components 120, and a power supply 122.

Memory 112 might take the form of one or more of the aforementioned media. Thus, we will not elaborate more here, only to say that memory component 112 can include any type of medium that is capable of storing information in a manner readable by a computing device. Processor 114 might actually be multiple processors that receive instructions and process them accordingly. Presentation component 116 includes the likes of a display, a speaker, as well as other components that can present information (such as a lamp (LED), or even lighted keyboards).

Radio 117 represents a radio that facilitates communication with a wireless telecommunications network. Illustrative wireless telecommunications technologies include CDMA, GPRS, TDMA, GSM, and the like. In some embodiments, radio 117 might also facilitate other types of wireless communications including Wi-Fi communications and GIS communications.

Input/output port 118 might take on a variety of forms. Illustrative input/output ports include a USB jack, stereo jack, infrared port, proprietary communications ports, and the like. Input/output components 120 include items such as keyboards, microphones, touch screens, and any other item usable to directly or indirectly input data into mobile device 100. Power supply 122 includes items such as batteries, fuel cells, or any other component that can act as a power source to power mobile device 100.

Figure 2:
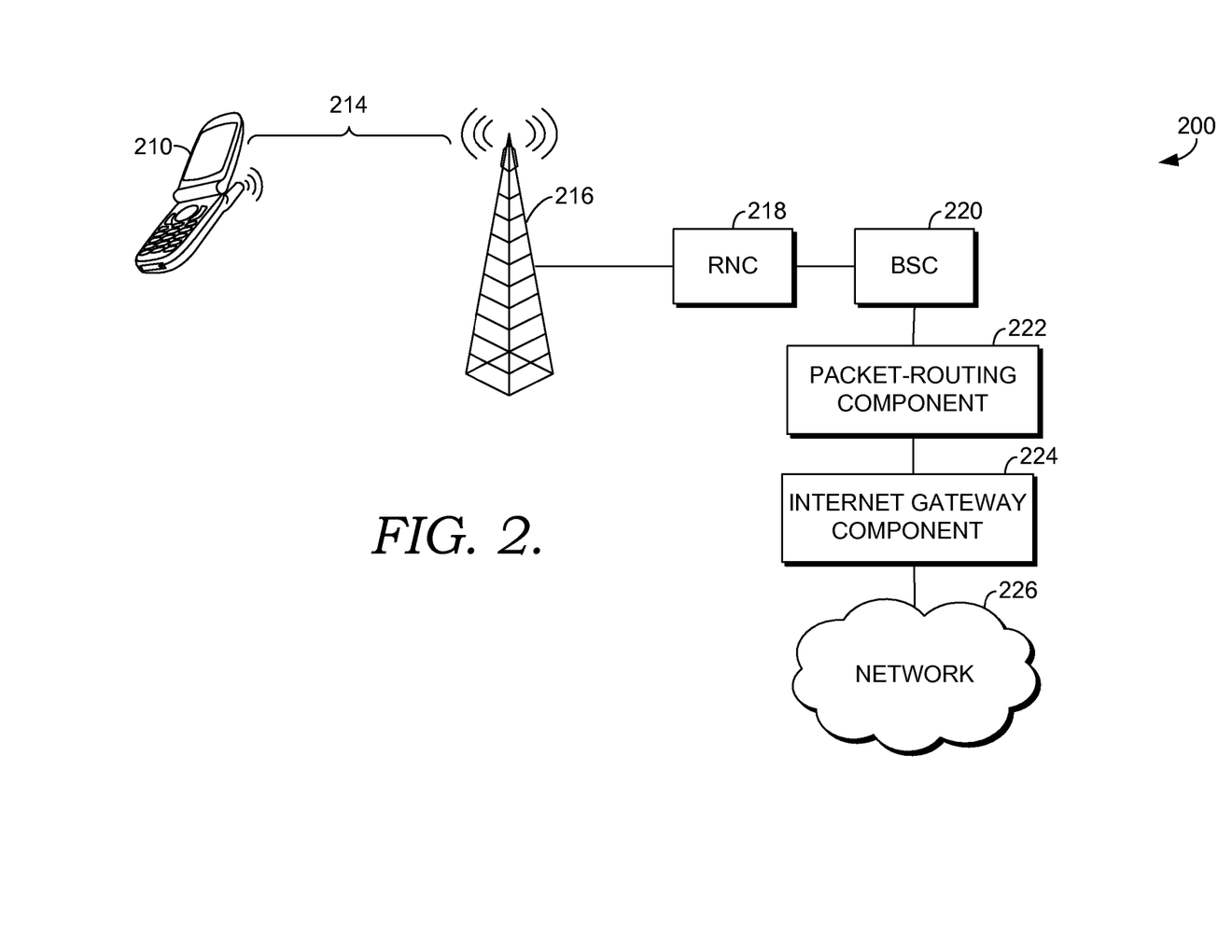
FIG. 2 depicts an operating system for carrying out embodiments of the present invention.

Turning now to FIG. 2, an illustrative operating environment is provided and referenced generally by the numeral 200, which depicts an illustrative networking environment that facilitates the transmission of data packets through a wireless communications network. Mobile device 210 is the type of device described in connection with FIG. 1, in one embodiment. Mobile device 210 communicates with an access component 216 by way of a communications link 214. Communications link 214 may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include a Wi-Fi connection to a device (e.g., mobile hotspot) that provides access to a wireless communications network, such as a WLAN connection using 802.11 protocol. This network is illustrated in FIG. 2 as item 226. A long-range connection may include a connection using one or more of CDMA, GPRS, GSM, TDMA, 802.16, LTE, or LTE-Advanced. Other technologies not mentioned herein are contemplated to be within the scope of the present invention.

Generally, the access component 216 provides access to what some skilled artisans refer to as a wireless communications network, also termed a core network, illustrated in FIG. 2 as network 226. A wireless communications network may comprise one or more of the components illustrated in FIG. 2. To the contrary, not all components that make up a wireless communications network are shown. Also, not all connections or possible connections are shown. The access component 216 may be one or more of or may include a base transceiver station (BTS) tower, a wireless access component, a mobile hotspot, and any other device that facilitates communication between mobile device 210 and network 226. In one embodiment, the access component 216 includes both a Wireless access component and a BTS tower. In another embodiment, access component 216 is a BTS tower. In the case of an LTE or LTE-Advanced network, the BTS is termed eNodeB or NodeB. A radio network controller (RNC) 218 performs various functions, such as managing radio channels, power control, load control, admission control, packet scheduling, handover control, macrodiversity, security functions, and mobility management. A base station controller (BSC) 220 is also shown in FIG. 2. The BSC acts as the intelligence behind base transceiver stations (BTS) and handles allocation of radio channels, receives measurements from mobile devices, and controls handovers from one BTS to another BTS. As such, the BSC 220 may receive location data from mobile devices that may have been measured using a global positioning system (GPS), an assisted GPS (AGPS), or network measurements, such as estimations of a mobile device's current location based on signal strength, power levels, etc., from the base stations. For example, data may be collected from network switches as base stations gather data at the switch level.

The components illustrated in FIG. 2, such as those that may be included in a wireless communications network include a packet-routing component 222 and an Internet gateway component 224. As mentioned, other components not shown here may also be used to carry out aspects of the present invention. For instance, a customer-profile database and an authentication component, such as an authentication, authorization, and accounting (AAA) server may be included in the wireless network, although not shown in FIG. 2. Further, several components shown in FIG. 2 may be combined into a single component although shown separately in FIG. 2. A packet-routing component 222 may be known to those of ordinary skill in the art as a packet data serving node (PDSN), typically used in CDMA networks; a foreign agent (FA); a Local Mobility Anchor (LMA) used for PMIP functions in the PDSN for IPv6; or a serving GPRS support node (SGSN), typically used in GSM and UMTS networks. Additionally, an Access Service Network (ASN) gateway may be used and is typically used in WiMAX networks.

If the wireless communications network utilizes LTE or LTE-Advanced, the packet-routing component 222 may be a Serving Gateway (SGW) and/or a PDN Gateway (P-GW). The SGW is responsible for routing and forwarding user data packets while acting as the mobility anchor for the user plane during inter-eNodeB handovers. The PGW provides connectivity from the mobile device 210 to external packet data networks by being the point of exit and entry of traffic for the mobile device 210. The packet-routing component 222 acts as the serving point between the radio access and IP networks. It is responsible for managing point-to-point protocol (PPP) sessions between the mobile provider's core IP network 226 and the mobile device 210. At a high level, the packet-routing component 222 helps provide access to the Internet as well as to other network technologies and application services. It helps provide mobile IP (MIP) access, one-agent support, and transportation of packets to facilitate the tunneling or communicating of data through virtual private networks. It can act as a client for an authentication server, which helps ensure that mobile device 210 is authorized to communicate via the wireless communications network.

In one embodiment, LTE or LTE-A technology may be used in the wiresless communications network, such that, as described above, the access component 216 is a EUTRAN Node B (eNodeB). The BSC 220 is a Mobility Management Entity. Further, in this embodiment, the packet-routing component 222 is a SGW, the Internet gateway component 224 is a P-GW, and the authentication component (not shown) is a Home Subscriber Server (HSS). In one embodiment, the packet-routing component 222 includes a set of computer-executable instructions that helps carry out various aspects of technology described herein. The Internet gateway component 224 is responsible for allocating IP addresses to mobile devices. The Internet gateway component 224, in one embodiment, is a home agent (e.g., HA).

Figure 3:
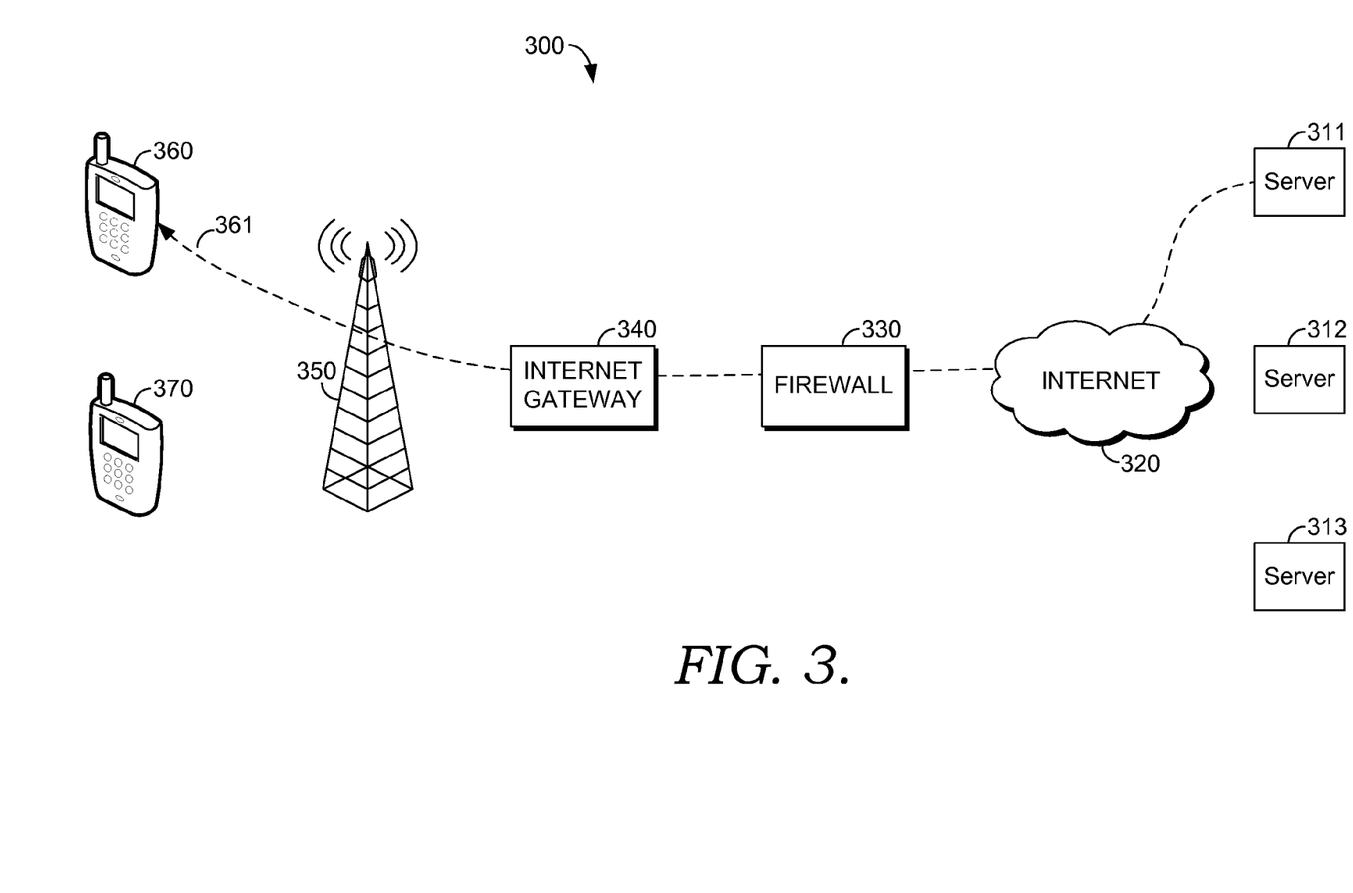
FIG. 3 depicts an illustrative environment in which an embodiment of the present invention may operate.

Turning now to FIG. 3, an illustrative operating environment that facilitates the transmission of data packets through a wireless communications network is provided and referenced generally by the numeral 300. There are servers 311-313, Internet 320, firewall 330, Internet gateway 340, access entity 350, and mobile devices 360 and 370. Access entity 350 can be a base transceiver station (BTS) tower, an eNodeB, a Wireless access component, a Mobile Hotspot, or any other device that facilitates communication between mobile devices 360-370 and servers 311-313. In addition, there is also data packet 361 originating from one of the servers 311-313 and initially destined for mobile device 360. Data packet 361 as used herein may be one or more units of formatted data transmitted over a network. Examples of data packet 361 may include audio files such as .wav, video files such as .mpeg, picture files such as .jpeg, web pages such as .html, or word processing documents such as .doc.

In one embodiment, mobile device 360 may be connected to the wireless communications network and assigned an IP address 1.1.1.1. Mobile devices 360 and 370 may be any type of mobile device, such as the mobile device 100 described hereinabove with reference to FIG. 1. Mobile device 360 may request data packet 361 (e.g., video stream) from server 311 thereby initiating a user session. Mobile device 360 may disconnect from the network due to a variety of reasons including battery life, roaming, etc. However, the user session does not terminate. Therefore, data packet 361 continues to stream from server 311 to Internet gateway 340. The Internet gateway is a routing device or a bridging device such as HA, PDSN, Serving Gateway (S-GW), P-GW, or ASN-GW. Mobile device 370 may be connected to the same network and be assigned the IP address 1.1.1.1 immediately after or at some other time after mobile device 360 is disconnected from the network. Alternatively, no new mobile device may be assigned the IP address 1.1.1.1. Mobile device 370 provides an end point for the Internet gateway 340 to forward the data packet 361 to although mobile device 370 did not request data packet 361. Furthermore, although mobile device 360 is not receiving data packet 361, its user may still be billed for data packet 361, as the user or communications session is ongoing. In order to resolve these problems, the present invention has devised an unnecessary traffic avoidance table to be maintained at the Internet gateway 340.

Figure 4:
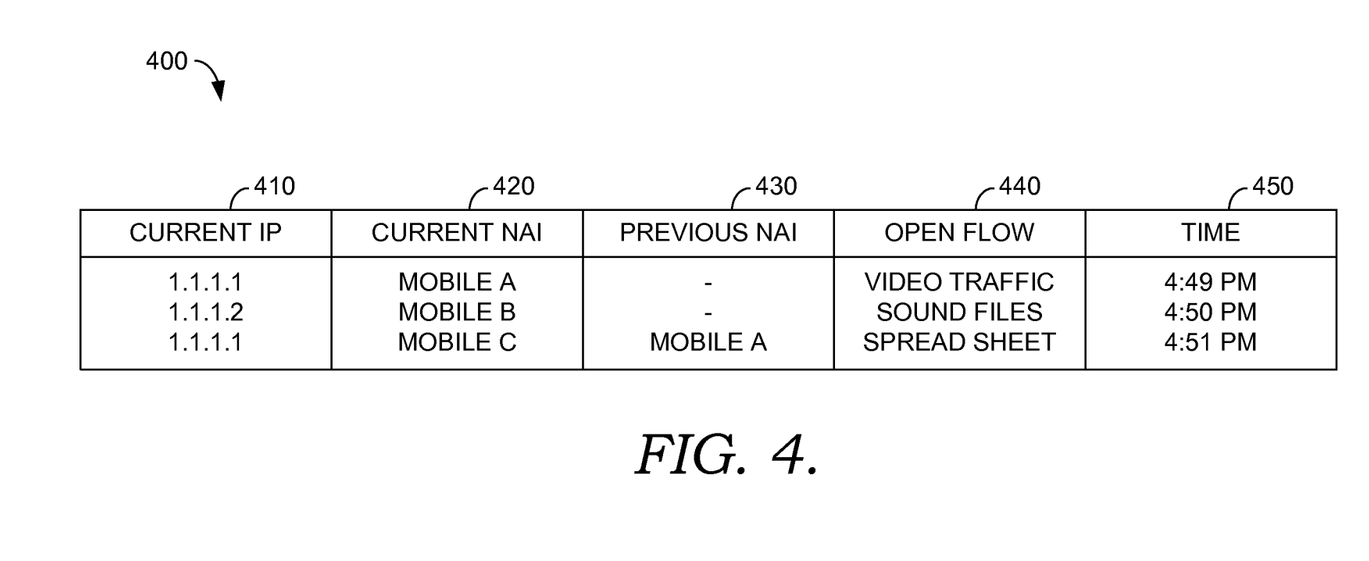
FIG. 4 depicts an unnecessary traffic avoidance table, in accordance with an embodiment of the present invention.

Turning now to FIG. 4, an unnecessary traffic avoidance table is shown, in accordance with an embodiment of the present invention. An Internet gateway, such as Internet gateway 340 shown in FIG. 3, maintains the unnecessary traffic avoidance table 400. An embodiment of table 400 includes the fields: current IP address 410, current NAI 420, previous NAI 430, open flow 440, and time 450. The table 400 maintains a record of mobile devices connected to the network. When a mobile device is first connected to the network, an IP address is assigned to the mobile device. There may be a pool of multiple mobile IP addresses that can be assigned to mobile devices. Each mobile device is also assigned an NAI for identification in the network. In FIG. 4, a mobile device associated with the NAI mobile A is assigned IP address 1.1.1.1 and a second mobile device associated with the NAI mobile B is assigned IP address 1.1.1.2. Current IP 410 field designates an IP address that is currently assigned to an active mobile device connected to the network. Current NAI 420 field designates the NAI of active mobile devices currently connected to the network. Previous NAI 430 field is populated whenever there is a transfer of IP address from one mobile device to another. For instance, in FIG. 4, mobile A is the previous NAI associated with IP address 1.1.1.1 because mobile A disconnected from the network at some point and IP address 1.1.1.1 was subsequently reassigned to mobile C.

Open flow 440 displays information regarding the data packets sent to the current NAI. For instance, mobile A received video traffic, mobile B received sound files, and mobile C received a spreadsheet. Time 450 displays the time at which the data packets under open flow 440 were sent or received. For instance, video traffic was sent to mobile A at 4:49 p.m. Internet gateway uses table 400 to determine which mobile device has been disconnected and when to discard data packets. For instance, the Internet gateway will recognize from the table 400 that mobile A was disconnected from the network because IP address 1.1.1.1 has been reassigned to mobile C. Therefore, the previous video traffic requested by mobile A at around 4:49 p.m. will be discarded and not sent to mobile C. In addition, mobile A's user session, which started at 4:49 p.m., is also terminated at around 4:51 p.m. The result avoids billing mobile A for data it did not receive, prevents sending and billing mobile C data packets it did not request, and circumvents unnecessary traffic in the network. Furthermore, mobile C will not need to allocate finite battery resource to downloading unnecessary data. Ultimately, the user experiences for users of both mobiles A and C will be better. The same result may also occur when IP 1.1.1.1 is not subsequently reassigned to another mobile device after mobile A has become disconnected. Ordinarily in such a scenario, the Internet gateway would continue to receive data packets from a server, but would not have an end point to forward the data packets. However in embodiments of the current invention, upon determining that mobile A has been disconnected, the Internet gateway would discard the data packets and terminate the user session associated with mobile A and IP 1.1.1.1. The table 400 may be refreshed at certain times to free up storage space. Refresh may occur, for exemplary purposes only, after unnecessary data is discarded or periodically throughout the day.

Figure 5:
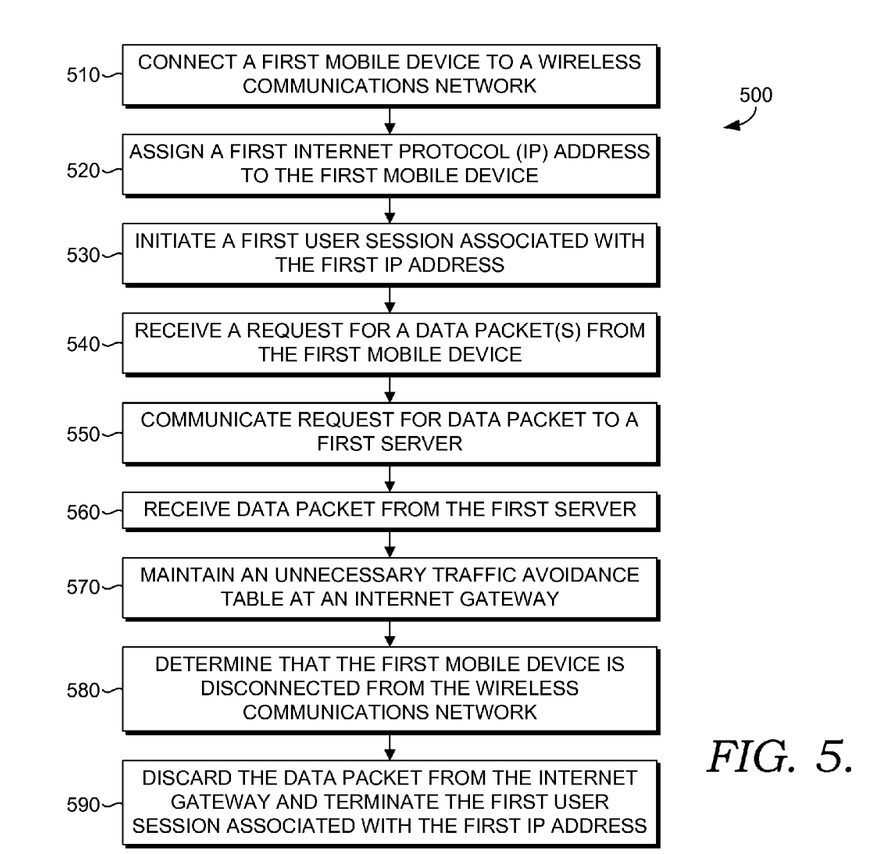
FIG. 5 illustrates a flow diagram of a method for avoiding unwanted data packets, in accordance with an embodiment of the present invention.

Turning now to FIG. 5, a flow diagram 500 is shown of a method for avoiding unwanted data packets, in accordance with an embodiment of the present invention. In step 510, a first mobile device having a first Network Access Identifier (NAI) is connected to a wireless communications network. The mobile device may be a type of mobile device 100 described hereinabove with reference to FIG. 1. The wireless communications networks may be a type of network 200 described hereinabove with reference to FIG. 2. In step 520, a first Internet Protocol (IP) address is assigned to the first mobile device. After connecting to the network, a mobile device may be assigned to the first available IP address from a pool of IP addresses. There are many ways of assigning IP addresses to a mobile device, all of which are not described herein for brevity purposes. In step 530, a first user session associated with the first IP address is initiated. Customers of wireless service may be billed according to the length of a user session or the amount of data downloaded during a user session.

At step 540, at an Internet gateway, a request is received for at least one data packet from the first mobile device. At step 550, the request for the at least one data packet is communicated to a first server, and at step 560, at least one data packet is received from the first server. An Internet gateway can be a routing device or a bridging device such as a home agent (HA), packet data serving node (PDSN), serving gateway (S-GW), packet data network gateway (P-GW), and access service network gateway (ASN-GW). At step 570, an unnecessary traffic avoidance table is maintained at the Internet gateway that includes a mapping of, at least, the first IP address and an NAI corresponding to a mobile device that is currently associated with the first IP address. The unnecessary traffic avoidance table may also include other data such as an NAI previously associated with the first IP address; open traffic flow (e.g., a type of data requested); and open traffic flow time-stamp mapped to the first IP address, current IP address, and previous IP address (e.g., time associated with the request of data).

At step 580, at the Internet gateway, it is determined that the first mobile device is disconnected from the wireless communications network if the unnecessary traffic avoidance table indicates, based on the NAI mapped to the first IP address, that a second mobile device is currently associated with the first IP address. For instance, the first mobile device may have gotten disconnected from the wireless communications network due to a variety of reasons including losing network signal reception, roaming, and running out of battery. When a mobile device becomes disconnected from the network, its assigned IP address becomes a free agent and returns to the pool of IP addresses. The second mobile device is assigned the next available IP address, which is also the first IP address. Finally, at step 590, upon determining that the first mobile device is disconnected from the wireless communications network, discard the at least one data packet from the Internet gateway and terminate the first user session associated with the first IP address. When the first user session is terminated, the first mobile device will no longer be billed for any transfer of data thereafter. When the data packet is discarded, the second mobile device will not receive any data packet it did not request.

Figure 6:
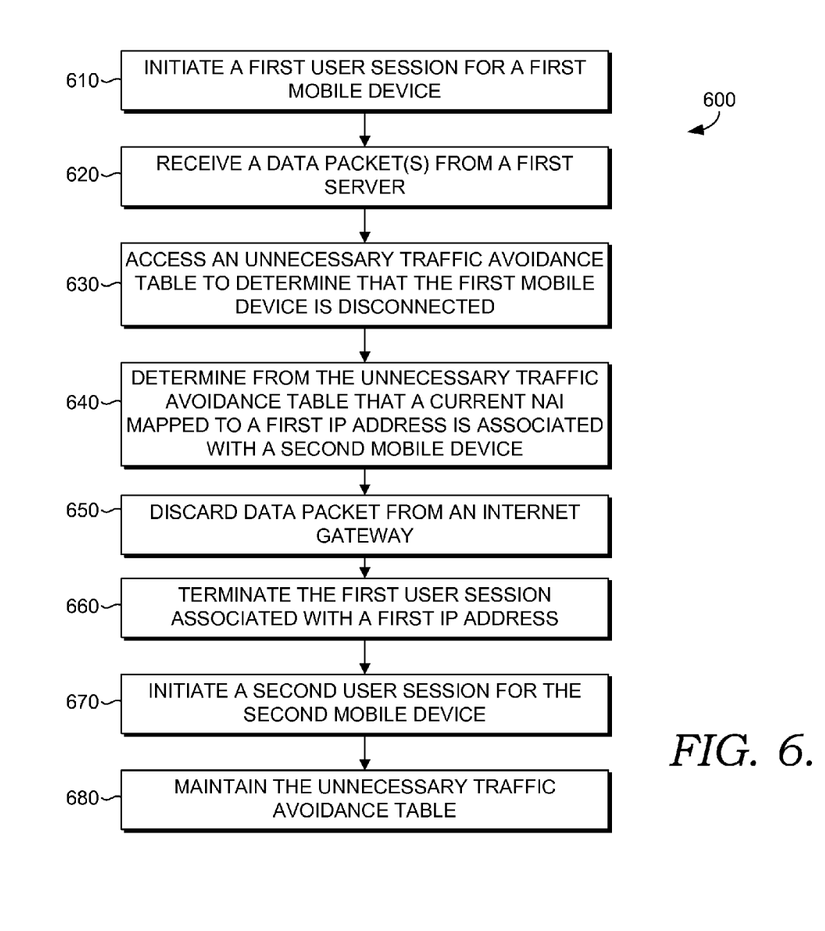
FIG. 6 illustrates a flow diagram of a method for avoiding unwanted data packets at an Internet gateway, in accordance with an embodiment of the present invention.

Turning now to FIG. 6, a flow diagram 600 is shown of a method for avoiding unwanted data packets at an Internet gateway, in accordance with an embodiment of the present invention. At step 610, a first user session is initiated for a first mobile device having a first NAI and a first IP address. At step 620, at an Internet gateway, at least one data packet is received from a first server and at step 630, an unnecessary traffic avoidance table is accessed to determine that the first mobile device is disconnected from a wireless communications network. The table may include a current NAI and a previous NAI mapped to the first IP address. The Internet gateway may be a routing device or a bridging device such as HA, PDSN, S-GW, P-GW, and ASN-GW. The unnecessary traffic avoidance table may further include data regarding open traffic flow and open traffic flow time-stamp mapped to the first IP address, current IP address, and previous IP address. At step 640, at the Internet gateway, it is determined from the unnecessary traffic avoidance table that the current NAI mapped to the first IP address is associated with a second mobile device. This is indicative that the first mobile device has disconnected from the network and that the first IP address has been reassigned to the second mobile device.

At step 650, based on the determination that the current NAI mapped to the first IP address is associated with the second mobile device, the at least one data packet is discarded from the Internet gateway. Discarding the data packet will prevent it from reaching the second mobile device, which did not request and probably does not want the data packet. At step 660, the first user session associated with the first IP address is terminated. Terminating the user session will prevent incorrect billing for the first and second mobile devices. At step 670, a second user session is initiated for the second mobile device having a second NAI and the first IP address. A second user session is associated with a new billing cycle and the data sent during the second user session is only received by the second mobile device. In addition, no data in the second user session will be discarded unless the second mobile device becomes disconnected. Finally at step 680, the unnecessary traffic avoidance table is maintained. The Internet gateway may refresh, modify, or erase the data in the unnecessary traffic avoidance table according to predetermined protocols.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. One or more computer-readable storage media having computer-executable instructions embodied thereon that, when executed by a computing device, cause the computing device to perform a method of avoiding unnecessary traffic in a wireless communications network, the method comprising:
    connecting a first mobile device having a first Network Access Identifier (NAI) to a wireless communications network;
    assigning a first Internet Protocol (IP) address to the first mobile device;
    initiating a first user session associated with the first IP address;
    at an Internet gateway, receiving a request for at least one data packet from the first mobile device;
    communicating the request for the at least one data packet to a first server;
    receiving the at least one data packet from the first server;
    maintaining an unnecessary traffic avoidance table at the Internet gateway that includes a mapping of, at least, the first IP address, an NAI corresponding to a mobile device that is currently associated with the first IP address, an open traffic flow, and an open traffic flow time stamp associated with a request for data of the open traffic flow;
    determining that the first mobile device is disconnected from the wireless communications network if the unnecessary traffic avoidance table indicates, based on the NAI mapped to the first IP address, that a second mobile device is currently associated with the first IP address;
    upon determining that the first mobile device is disconnected from the wireless communications network, discarding the at least one data packet from the Internet gateway and terminating the first user session associated with the first IP address; and
    utilizing the mapped time stamp and the mapped open traffic flow, determining the received at least one data packet was not requested by the second mobile device and should not be billed to the second mobile device.

2. The one or more computer-readable storage media of claim 1, wherein the Internet gateway is a routing device or a bridging device that comprises one or more of a home agent, a packet data serving node, a serving gateway, a packet data network gateway, or an access service network gateway.

3. The one or more computer-readable storage media of claim 1, wherein the unnecessary traffic avoidance table further comprises a type of data requested by the first mobile device.

4. The one or more computer-readable storage media of claim 1, wherein the first mobile device is disconnected from the wireless communications network due to one or more of losing network signal reception, entering a roaming network, or depletion of battery of the first mobile device.

5. The one or more computer-readable storage media of claim 1, further comprising initiating a second user session associated with the first IP address.

6. The one or more computer-readable storage media of claim 1, wherein upon determining that the first mobile device is disconnected from the network, further comprising updating all previously collected data in the unnecessary traffic avoidance table.

7. The one or more computer-readable storage media of claim 1, further comprising:
    communicating a request for at least one data packet to a second server; and
    receiving the at least one data packet from the second server.

8. One or more computer-readable storage media having computer-executable instructions embodied thereon that, when executed by a computing device, cause the computing device to perform a method of avoiding unnecessary traffic in a wireless communications network, the method comprising:
    initiating a first user session for a first mobile device having a first Network Access Identifier (NAI) and a first Internet Protocol (IP) address;

at an Internet gateway, receiving a plurality of data packets from a first server and sending a portion of the plurality of data packets to the first IP address;

accessing an unnecessary traffic avoidance table to determine if the first mobile device is disconnected from a wireless communications network, wherein the table includes a current NAI, a previous NAI mapped to the first IP address, an open traffic flow, and an open traffic flow time stamp associated with a request for data of the open traffic flow;

determining from the unnecessary traffic avoidance table that the current NAI mapped to the first IP address is associated with a second mobile device;

based on the determination that the current NAI mapped to the first IP address is associated with the second mobile device, discarding a remaining portion of the plurality of data packets not sent to the first IP address from the Internet gateway;

terminating the first user session associated with the first IP address;

utilizing the mapped open traffic flow and the mapped open traffic flow time stamp, determining that the remaining portion of the plurality of data packets should not be billed to the first mobile device or to the second mobile device; and determining the first mobile device should not be billed for any data transfer after the first user session is terminated;

initiating a second user session for the second mobile device having a second NAI and the first IP address; and maintaining the unnecessary traffic avoidance table.

9. The one or more computer-readable storage media of claim 8, wherein maintaining the unnecessary traffic avoidance table comprises modifying values or deleting previously collected data.

10. The one or more computer-readable storage media of claim 8, wherein the Internet gateway is a routing device or a bridging device that comprises one or more of a home agent, a packet data serving node, a serving gateway, a packet data network gateway, or an access service network gateway.

11. The one or more computer-readable storage media of claim 8, wherein the unnecessary traffic avoidance table further comprises data regarding a type of data requested and a time stamp associated with a receipt of the at least one data packet from the first server.

12. The one or more computer-readable storage media of claim 8, wherein the first mobile device is disconnected from the network due to losing network signal reception, entering a roaming network, or depletion of battery.

13. A system for avoiding unnecessary traffic in a wireless communications network, the system comprising:

an Internet gateway capable of:
(1) communicating with a first mobile device to receive a request from the first mobile device for one or more data packets and to send the one or more data packets to the first mobile device from one or more servers,
(2) maintaining an unnecessary traffic avoidance table that includes a mapping of, at least, a first NAI corresponding to the first mobile device and a second NAI corresponding to a second mobile device mapped to a first IP address, an open traffic flow, and an open traffic flow time stamp associated with a request for data of the open traffic flow, wherein the first NAI is previously associated with the first IP address and wherein the second NAI is currently associated with the first IP address, and
(3) accessing the unnecessary traffic avoidance table to determine to discard the one or more data packets received from the one or more servers prior to sending the one or more data packets to the first mobile device if the first IP address is currently associated with the second mobile device that did not request the one or more data packets received from the one or more servers, and determining, using the unnecessary traffic avoidance table, that the discarded one or more data packets should not be billed to the first mobile device or to the second mobile device based on the first IP address being currently associated with the second mobile device;

and at least one server capable of communicating with the Internet gateway, wherein communicating with the Internet gateway comprises sending the one or more data packets to the Internet gateway based upon a request for the one or more data packets by the first mobile device.

14. The system of claim 13, further comprising the first mobile device that previously requested the one or more data packets, but that has been disconnected from the wireless communications network such that the one or more data packets are not delivered to the first mobile device.

15. The system of claim 13, wherein the Internet gateway is a routing device or bridging device that comprises one or more of a home agent, a packet data serving node, a serving gateway, a packet data network gateway, or an access service network gateway.

16. The system of claim 13, wherein the open flow time stamp further comprises a time associated with the request from the first mobile device for the one or more data packets.

17. The system of claim 13, wherein the open traffic flow comprises a type of data.

* * * * *